Feb. 9, 1932.  L. W. THOMPSON  1,844,703
COMBINED CLUTCH AND SPEED ADJUSTING MECHANISM
Filed July 27, 1929
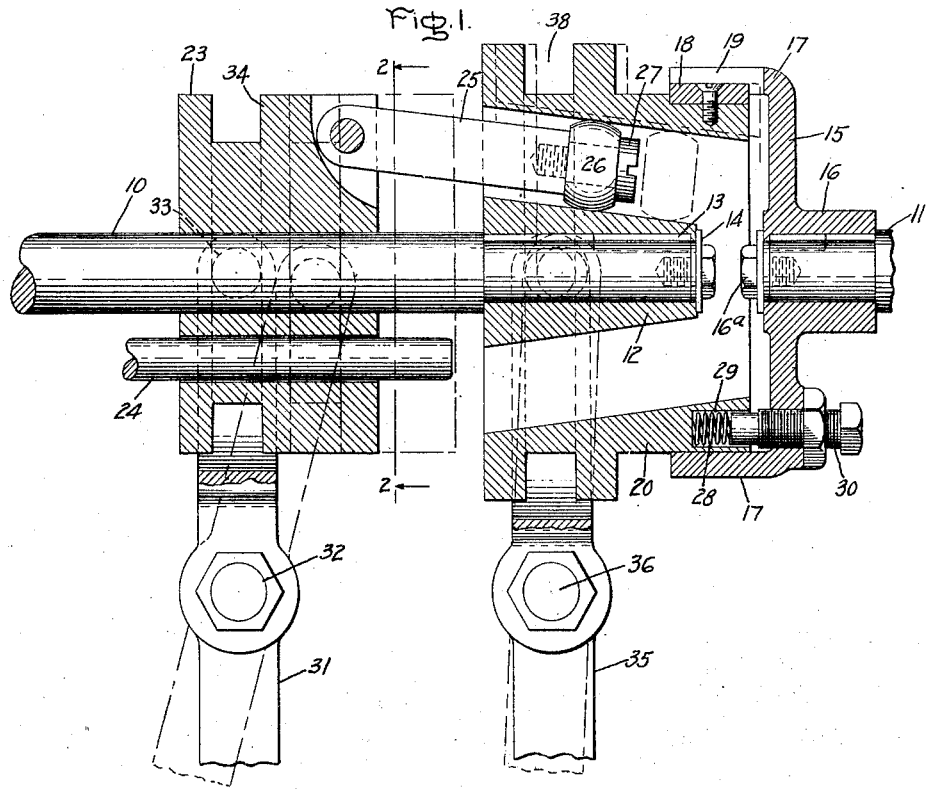
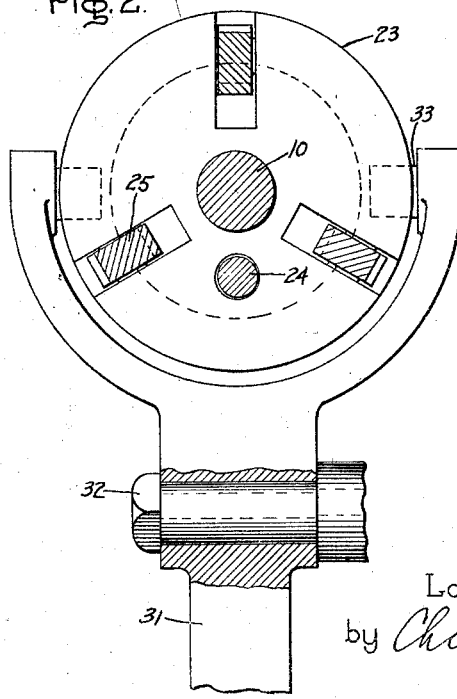
Inventor:
Louis W. Thompson,
by Charles E. Mullan
His Attorney.

Patented Feb. 9, 1932

1,844,703

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

COMBINED CLUTCH AND SPEED ADJUSTING MECHANISM

Application filed July 27, 1929. Serial No. 381,656.

The present invention relates to combined clutch and speed adjusting mechanisms for use in connecting together a driving and a driven shaft and obtaining adjustment of the speed of the driven shaft relative to the speed of the driving shaft. The invention may be utilized wherever it is found to be applicable. It is well adapted for use as a paper mill speed regulator, in which case it serves the purpose of a clutch, a differential and a speed adjusting means. Also, it is well adapted for use in such devices as automotive transmission systems wherein it affords a differential and speed changing means without the use of toothed gears.

The object of my invention is to provide an improved construction and arrangement in a mechanism of the above referred to character, and for a consideration of what I believe to be novel and my invention, attention is directed to the following specification and the claim appended thereto.

In the accompanying drawings, Fig. 1 is a central sectional view of a structure embodying my invention, full and dotted lines being used to show various positions of several parts, and Fig. 2 is a sectional view taken along the line 2—2 of Fig. 1.

Referring to the drawings, 10 designates a driving shaft and 11 a driven shaft. On the end of the shaft 10 is a tapered cone 12 which is secured non-rotatably relatively to the shaft by a key 13 and a bolt and washer 14. The cone 12 tapers in converging direction toward the end of shaft 10. Secured to the end of shaft 11 is a plate member 15 having a hub 16 and a flange 17. Hub 16 is keyed to the end of shaft 11 and is fixed in place by a bolt 16ª. The flange 17 forms a cylinder in which a driving sleeve 20 is free to slide longitudinally. One or more keys 18 secured to said sleeve cooperate with slots 19 in flange 17 to form a driving connection between the flange and the sleeve but at the same time permit of a limited longitudinal movement of the sleeve in the flange. The inner surface of sleeve 20 tapers convergingly toward the end which engages flange 17, the tapered surfaces of the cone and sleeve being paralled to each other.

A sliding sleeve 23 is loosely mounted on shaft 10 and is held from rotation by a stationary lock rod 24 which may be fixed to a suitable supporting post (not shown). Shaft 10 is thus free to rotate in said sleeve. Pivoted to sleeve 23 are one or more arms 25 which project into the space between cone 12 and sleeve 20 and carry rollers 26 at their free ends adapted to engage with the tapered surfaces of the cone and sleeve. The rollers are held in place by studs 27. In the present instance three arms and three rollers are shown, but a greater or lesser number may be used depending upon the load to be transmitted. The sleeve 20 is biased in a direction to cause its inner tapered surface to engage rollers 26 by a spring or springs 28 located in a suitable recess or recesses 29 in the sleeve. The tension of each spring 28 may be adjusted by a lock bolt 30 threaded to the plate 15. Any suitable means may be employed to bias sleeve 20 in a direction toward the rollers 26, the arrangement of springs shown being only by way of example. Springs 28 resiliently hold the sleeve 20 against rollers 26, which are in turn forced against the periphery of cone 12. The relative speeds of shafts 10 and 11 depend on the relative diameters of the cone 12 and sleeve 20 at the plane of engagement of the cone and sleeve with rollers 26. The position of the rollers 26 relative to the cone 12 and sleeve 20 is adjusted by a forked lever 31 pivotally mounted on a stud 32 fixed to a suitable stationary support (not shown). The ends of forked lever 31 have inwardly projecting pins 33 which engage in an annular groove 34 around the periphery of sleeve 23.

Sleeve 20 may be moved relatively to the cone 12 and the rollers 26 against the biasing action of springs 28 by a forked clutch lever 35 which is pivoted on a stud 36 and is provided with inwardly projecting pins 37 at its ends which engage an annular groove 38 formed on sleeve 20.

When the parts are in the positions shown in full lines in Fig. 1 of the drawings, driving shaft 10 drives the driven shaft 11 through the intermediary of cone 12, rollers 26, sleeve 20 and plate 15. The springs 28 serve to hold the inner surface of sleeve 20 in firm engagement with rollers 26, forcing the rollers firmly against the outer surface of cone 12. The cone 12 effects turning movement of rollers 26 due to the frictional engagement between them and the rollers 26 in turning rotate sleeve 20 and hence the shaft 11. The relative rate of rotation of shafts 10 and 11 depends upon the relative diameters of the cone 12 and inner surface of sleeve 20 in the plane in which the rollers are located. By moving sliding sleeve 23 toward the right as shown in Fig. 1, the speed of the driven shaft 11 will be decreased relatively to that of the driving shaft, while by moving sliding sleeve 23 toward the left the speed of the driven shaft 11 will be increased relatively to that of the driving shaft. The dotted lines in Fig. 1 indicate the position of the parts when sliding sleeve 23 is moved toward the right. Irrespective of the position of the rollers 26 between cone 12 and sleeve 20, the springs 28 serve to maintain the surfaces of the cone and sleeve in firm engagement with the rollers. This provides a simple form of speed adjusting means comprising few parts which are of relatively simple character and which are easily adjusted.

By moving sleeve 20 toward the right in Fig. 1 by means of the clutch lever 35, sleeve 20 can be moved away from rollers 26 thereby disconnecting the driving shaft from the driven shaft. The disconnected position of sliding sleeve 20 is indicated in the dotted lines in Fig. 1. The arrangement forms a simple and easily operated form of clutch mechanism and one which can be engaged and disengaged to affect a gradual application and removal of the load on the driven shaft to and from the driving shaft.

In accordance with the provisions of the patent statutes, I have described the principle of operation of my invention together with the apparatus which I now consider to represent the best embodiment thereof. It is to be understood, however, that the arrangement shown is only illustrative and that the invention may be carried out by other means.

What I claim as new and desire to secure by Letters Patent of the United States, is:

In a power transmission mechanism, the combination of, a drive shaft, a friction cone keyed to said drive shaft, a driven shaft in alignment with said drive shaft, a friction cone keyed to said driven shaft, concentric with the cone on said drive shaft and spaced therefrom, a sleeve mounted on said drive shaft to slide therealong, but non-rotatable therewith, arms pivotally mounted on said sleeve and projecting into the space between said cones, rollers mounted on the free ends of said arms adapted to engage the surfaces of said friction cones, and means for moving said sleeve axially of said drive shaft to move said rollers relatively to the surfaces of said friction cones.

In witness whereof, I have hereto set my hand this 26th day of July, 1929.

LOUIS W. THOMPSON.